(12) United States Patent
Bennett

(10) Patent No.: US 11,192,504 B2
(45) Date of Patent: Dec. 7, 2021

(54) HINGE MOUNT SYSTEM FOR UTILITY VEHICLE

(71) Applicant: OMIX-ADA, INC., Ann Arbor, MI (US)

(72) Inventor: Patrick W. Bennett, Gainesville, GA (US)

(73) Assignee: OMIX-ADA, INC., Ann Arbor, MI (US)

( * ) Notice: Subject to any disclaimer, the term of this patent is extended or adjusted under 35 U.S.C. 154(b) by 139 days.

(21) Appl. No.: 16/261,726

(22) Filed: Jan. 30, 2019

(65) Prior Publication Data

US 2019/0275952 A1 Sep. 12, 2019

Related U.S. Application Data

(60) Provisional application No. 62/641,063, filed on Mar. 9, 2018.

(51) Int. Cl.
*B60R 11/00* (2006.01)

(52) U.S. Cl.
CPC ......... *B60R 11/00* (2013.01); *B60R 2011/004* (2013.01); *B60R 2011/008* (2013.01); *B60R 2011/0052* (2013.01)

(58) Field of Classification Search
USPC ............... 224/400, 401, 441, 442, 443, 451; 280/288.4, 293, 291, 294; 248/200, 248/205.1, 230.31, 220.41, 224.8, 309.1
See application file for complete search history.

(56) References Cited

U.S. PATENT DOCUMENTS

| | | | | |
|---|---|---|---|---|
| 2,614,628 A | * | 10/1952 | Riemann | B60J 3/002 160/211 |
| 2,628,807 A | * | 2/1953 | Lincoln | B60J 3/002 248/231.71 |
| 3,174,792 A | * | 3/1965 | Demas | B60J 1/06 296/87 |
| 9,505,352 B2 | | 12/2016 | Fife | |
| 2010/0107368 A1 | * | 5/2010 | Chou | G06F 1/1616 16/305 |
| 2010/0230566 A1 | * | 9/2010 | Neufeglise | B60Q 1/2611 248/222.14 |

(Continued)

OTHER PUBLICATIONS

Canadian Examiners Report for Canadian Application 3,033,758, dated Jan. 14, 2020.

(Continued)

*Primary Examiner* — Alfred J Wujciak
(74) *Attorney, Agent, or Firm* — The Dobrusin Law Firm, P.C.

(57) ABSTRACT

An accessory mount for a vehicle comprising: (a) one or more hard mounting points, (b) a body mount portion configured to connect to the vehicle, (c) a lateral support portion extending between and connecting the one or more hard mounting points and the body mount portion, and (d) a pivot portion connected to an extending from the lateral support portion, the pivot portion being configured to connect to a moving member of the vehicle; wherein the one or more hard mounting points are configured to accept an accessory bracket and the accessory bracket is configured to accept one or more accessories.

19 Claims, 6 Drawing Sheets

(56) References Cited

U.S. PATENT DOCUMENTS

2012/0180281 A1 7/2012 Miller et al.

OTHER PUBLICATIONS

Kargo Master, Hinge Steps, https://www.kargomaster.com/hinge-steps-pair, accessed Feb. 1, 2019.
Quadratec, BOLT Passenger Side J-Mount, https://www.quadratec.com/products/55216_906X_A_PG.htm?gclid=Cj0KCQiA-c_iBRChARIsAGCOpB28UY4Rh75-7aQ0_kQEk0rizxdhlkl37rZfe_r5Q6w1xJKkYDo3UHUaAvozEALw_wcB, accessed Feb. 1, 2019.

* cited by examiner

HINGE MOUNT SYSTEM FOR UTILITY VEHICLE

FIELD

The present teachings relate generally to vehicles and more specifically to accessory mounts that attach to reconfigurable off-road vehicles, and preferably off-road vehicles with removable doors, windows, or both.

BACKGROUND

Off-road vehicles such as those found in the Jeep®, Wrangler®, Wrangler JK®, and Wrangler JL® brands are popular among outdoor enthusiasts because of their rugged build, appearance, and ability to move over terrain where other vehicles cannot tread. In addition, the aforementioned brands of vehicles provide owners with modular capabilities, which is fueled by a robust aftermarket parts and accessories industry.

Often when off-roading, owners of off-road vehicles, such as Jeep®, Wrangler®, Wrangler JK®, and Wrangler JL® brand vehicles, utilize aftermarket components to outfit the exterior of the vehicle with accessories such as auxiliary storage, tools, and lights for trips out in the wilderness. Additionally, while these vehicles have a rear cargo compartment behind the rear passenger seats, this compartment is relatively small and can be inadequate for storage of all the required gear. Aftermarket roof racks are available to provide auxiliary storage. Thus, owners may also wish to outfit the exterior of the vehicle with an accessory, such as a stepping platform, to provide easier access to roof-top auxiliary storage.

Aftermarket accessory mounts are available for off-road vehicles, such as Jeep®, Wrangler®, Wrangler JK®, and Wrangler JL® brand vehicles, which enable the owner to mount the aforementioned accessories to the exterior of the vehicle. In some instances, accessory mounts utilize hinge assemblies, such as those found to attach doors to door frames, to attach the accessory mounts. Use of these types of accessory mounts precludes simultaneous attachment of a door. Examples of some accessory mounts, particularly the use of which requiring the door to be removed, may be found in U.S. Pat. No. 9,505,352.

What is needed is an accessory mount that retains use of a door while the accessory mount is in use. What is needed is an accessory mount that attaches to other hinged interfaces of the vehicle, such as a fold-down windshields, and enable use of both the moving member and the accessory mount simultaneously.

SUMMARY

The present disclosure provides an accessory mount for a vehicle comprises one or more hard mounting points, a body mount portion configured to connect to the vehicle, a lateral support portion extending between and connecting the one or more hard mounting points and the body mount portion, and a pivot portion connected to and extending from the lateral support portion, the pivot portion being configured to connect to a moving member of the vehicle. The one or more hard mounting points are configured to accept an accessory bracket and the accessory bracket is configured to accept one or more accessories.

The present teachings provide an accessory mount for a utility vehicle comprises one or more hard mounting points, a body mount portion, a lateral support portion, and a pivot portion. The one or more hard mounting points are configured to accept an accessory bracket and the accessory bracket is configured to accept one or more accessories. The body mount portion is configured to fixedly attach to a moving member of the vehicle. The lateral support portion is configured to support the one or more hard mounting points. The pivot portion is configured to enable one or more moving members of the vehicle to operate while the one or more hard mounting points is engaged with the one or more accessories.

The present teachings provide an accessory mount for a utility vehicle comprises one or more hard mounting points, a body mount portion, a lateral support portion, and a pivot portion. The one or more hard mounting points are configured to accept an accessory bracket and the accessory bracket is configured to accept one or more accessories. The body mount portion is configured to fixedly attach to a moving member of the vehicle at a hinged interface. The lateral support portion is configured to support the one or more hard mounting points. The pivot portion is configured to enable one or more moving members of the vehicle to operate while the one or more hard mounting points is engaged with one or more accessories.

The present teachings provide an accessory mount that retains use of a door while the accessory mount is in use. The teachings herein provide accessory mounts that attach to other hinged interfaces of the vehicle, such as a fold-down windshields, and enable use of both the moving member and the accessory mount simultaneously.

DETAILED DESCRIPTION

Figure 1:
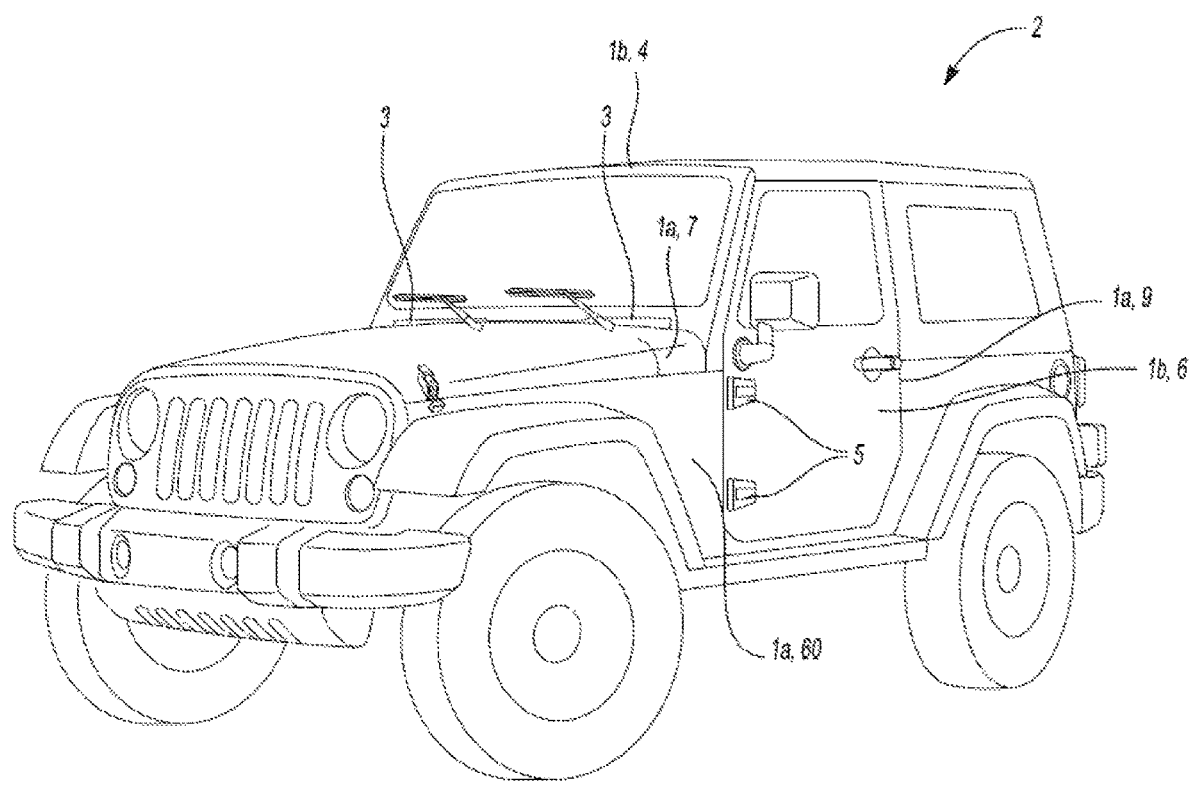
FIG. 1 is a perspective view of a vehicle.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to an accessory mount for a vehicle. The vehicle may be any vehicle customarily outfitted with accessories mounted outside the cab. The vehicle may include one or more modular parts or pieces that may be added or removed. Preferably, the vehicle is a utility vehicle, a sport utility vehicle, an off-road vehicle, or an all-terrain vehicle. More particularly, the vehicle may be of the Jeep®, Wrangler®, Wrangler JK®, and Wrangler JL® brands. The vehicle may include one or more moving members. Preferably, the one or more moving members include doors and a window frame.

The vehicle may include one or more vehicle frame members, which may function as components of the vehicle's chassis to provide structural support to the vehicle. Preferably, the one or more vehicle frame members may include one or more A-pillars, one or more B-pillars, one or more C-pillars, one or more door frames, one or more cowls, or a combination thereof. The A-pillars, B-pillars, or C-pillars may be structural elements of the vehicle's frame that are located adjacent the vehicle's door frame. The one or more vehicle frame members may bear a load of about 50 kg or more, preferably about 75 kg or more, or more preferably about 100 kg or more. The one or more vehicle frame members may bear a load of about 500 kg or less, about 350 kg or less, or about 200 kg or less. Preferably, the vehicle has at least an A-pillar (i.e., a two-door vehicle) but the vehicle may also have a B-pillar (i.e., a four-door vehicle), a C-pillar, D-pillar, or a combination thereof.

The one or more vehicle frame members may include two, three, four, five, six, or seven doorframes. The door frames may be configured to accept a door. The door frames may be structure adjacent to the A-pillar, B-pillar, or C-pillar. The door frames may be configured to include a hinged interface.

Further, the vehicle may include one or more hinged interfaces, which may function to support one or more moving members of a vehicle upon a vehicle frame member. The one or more hinged interfaces may function to permit a moving member to move relative to the vehicle. The one or more hinged interfaces may support one or more doors, one or more windshields, or both. The hinged interface may be any connection point where the pivot portion rotatably attaches to the vehicle. The hinged interface may be any interface between one or more vehicle frame members and one or more vehicle moving members. There may be one or more hinged interfaces, two or more hinged interfaces, four or more hinged interfaces, six or more hinged interfaces, eight or more hinged interfaces, or eighteen or less hinged interfaces. Preferably, the vehicle includes a plurality of hinged interfaces. The hinged interface may be a door hinge, window hinge, tailgate hinge, or a combination thereof. Preferably, the hinged interface is the front doors of a vehicle and each front door is attached by two or more hinged interfaces.

The cowl may be a structural component attached to the vehicle frame and may function to keep dirt and other debris from getting inside the engine compartment from between the vehicle hood and the windshield. The cowl may be a structure that the windshield frame is attached to. The cowl may be configured to enable attachment a foldable or non-foldable windshield frame. Preferably, the cowl is configured to enable attachment of a foldable windshield frame. The cowl may extend along the hood of the vehicle.

The one or more moving members may function to be a part of the vehicle that rotates relative to a remaining portion of the vehicle. The one or more moving members may be two or more, three or more, four or more, five or more, six or more, or seven or more doors. The doors may include side doors located on either side of the vehicle, windows, tailgates, rear door, hoods, or a combination thereof. Further, the vehicle may include a rear cargo door such as a tailgate or a hatchback. The doors may attach to the vehicle along the A-pillar, B-pillar, or C-pillar. The doors may attach to the vehicle at a hinged interface.

The one or more windshield frames may function to retain a windshield and permit movement of the windshield relative to the vehicle. The windshield frame, may be foldable or non-foldable. For example, if the windshield frame is foldable, the windshield frame rotates about an axis of rotation of a windshield.

The vehicle may include one or more windshield hinges, one or more door hinges, or both. The one or more windshield hinges may provide a hinged interface between one or more moving members and one or more vehicle frame members. More specifically, the windshield hinges may provide a hinged interface between the windshield frame and the cowl. More specifically, the windshield hinges may rotatably connect the windshield frame to the cowl. The door hinges may be one or more door hinges, typically provided as a pair of door hinges per door, and may provide a hinged interface between one or more moving members and one or more vehicle frame members. More specifically, the door hinges may provide a hinged interface between the door and the door frame. More specifically, the door hinges may rotatably connect the door to the door frame.

The accessory mount may function to accept accessory brackets, accessories, or both while simultaneously providing for the use of the moving members (e.g., door, windshield). The accessory mount may be any mounting hardware that provides a body mount portion, one or more hard mounting points, a pivot portion or a combination thereof. The accessory mount may attach to any hinged interface between a moving member and a fixed member of the vehicle. The moving member can include a door, a windshield frame, a tailgate or a hatchback. Preferably, the accessory mount may attach to any point on the vehicle having hinge hardware exposed on the exterior of the vehicle. Preferably, the accessory mount may attach to the windshield hinges of a fold-down windshield, the door hinges of the forward and rearward doors, the hinges of a cargo door, or a combination thereof. Further, the accessory mount may attach to any point of the vehicle providing enough structural support for exertion of a load of about 25 kg or more, about 50 kg or more, about 75 kg or more, or even about 100 kg or more. The accessory mount may provide enough structural support for exertion of a load of about 500 kg or less, about 400 kg or less, 300 kg or less, or about 200 kg or less. Preferably, the accessory mount may attach to an A-pillar, a B-pillar, or a cowl of the vehicle body.

The accessory mount may be form-fit to a particular portion of the vehicle body or be offset from the vehicle body. The accessory mount may have a complementary shape to one or more portions of a vehicle. For example, the accessory mount may be complementary in shape to a window, a hood, a door frame, or a combination thereof.

Preferably, the accessory mount is a windshield hinge bracket configured to form-fit to the window frame or a door hinge bracket configured to form-fit to the portion of the vehicle body wrapping laterally from the door frame to the vehicle exterior. For example, the windshield hinge bracket, being form-fit to the window frame may sit flush against the window frame and perhaps adjacent components of the vehicle (e.g., cowl or A-pillar). The vehicle may include a plurality of accessory mounts that may be located on the vehicle with the bilateral symmetry along the vehicle's longitudinal plane. Preferably, the accessory mount may be a left windshield hinge bracket, a right windshield hinge bracket, a left door hinge, a right door hinge, or a combination thereof. The accessory mount may be configured in accordance with different attachment layouts of the vehicle. For example, the hinge points of the upper door hinge and lower door hinge may demand a different mode of attachment. Preferably, the accessory mount is either an upper left door hinge bracket, a lower left door hinge bracket, an upper right door hinge bracket, a lower right door hinge bracket, or a combination thereof. The left door hinge brackets and the right door hinge brackets may be reverse mirror images of each other. The upper door hinge brackets and the lower door hinge brackets may be identical, interchangeable, or both. The door hinge brackets may be located in a forward position (e.g., proximate to an "A-pillar"), a rearward position (e.g., proximate to a "B-pillar"), or both. The accessory mount may include a body mount portion, a pivot portion, a lateral support portion, a flange portion, or a combination thereof.

The windshield hinge bracket may function to provide an accessory mount at the location of a windshield hinge. The windshield hinge bracket may be one or more windshield hinge brackets. The windshield hinge bracket may be either a left windshield hinge bracket or a right windshield hinge bracket in accordance with the windshield hinges on opposing sides of the longitudinal plane of the vehicle. The windshield hinge bracket may be configured to accept accessories intended for use at the height and approximate location of the windshield hinge. For example, the windshield hinge bracket may be configured to accept a side-mirror.

The door hinge bracket may function to provide an accessory mount at the location of the door hinges. The door hinge bracket may be one or more door hinge brackets. The door hinge bracket may be either a left door hinge bracket or a right door hinge bracket in accordance with the door hinges on opposing sides of the longitudinal plane of the vehicle. Additionally, the door hinge bracket may be an upper door hinge bracket or a lower door hinge bracket in accordance with a vertical plane (e.g., a plane that divides the door hinge bracket into a front half and a rear half) of the vehicle. The door hinge bracket may be configured to accept accessories intended for use at the height and approximate location of the door hinges. For example, the door hinge bracket may be configured to accept a step ladder, which provides for ease of access to the roof of the vehicle.

The body mount portion may function to provide structural support to the accessory mount by providing a firm and fixed attachment to the vehicle body. Preferably, the body mount portion is a bracket arm. More specifically, the bracket arm may be a windshield frame arm, an upper door frame arm, a lower door frame arm, or a combination thereof. The body mount portion may include structure enabling attachment to a specific segment of the vehicle body such as the hinged interfaces of the windshield frame and the door. Preferably, the body mount portion includes one or more arm bores that may accept one or more arm fasteners. The body mount portion may be configured to removably attach, via existing attachment points, to portions of the vehicle body. Preferably, the body mount portion may attach to the window frame, the door frame, or both of the vehicle. The body mount portion may attach to one model of a vehicle or may have a universal attachment so that the body mount may connect to more than one model of vehicle. The body mount portion may be configured to attach to specific segments of the vehicle, such as the hinged interfaces of the windshield frame and/or the door; may be configured for universal connectivity; or both. Preferably, the body mount portion is a windshield frame arm, an upper door frame arm, a lower door frame arm, or a combination thereof.

The windshield frame arm may function to be accepted by the existing interface of the windshield with the vehicle body. The windshield frame arm may provide the accessory mount with a static connection to the vehicle frame members.

The door frame arm may function to be accepted by the existing interface of the door with the vehicle body. The door frame arm may provide the accessory mount with a static connection to the vehicle frame members. The door frame arm may be an upper door frame arm, a lower door frame arm, or both.

The arm bores may function to accept fasteners to affix the body mount portion to a vehicle frame member. There may be one or more arm bores or six or less arm bores. The arm bores may be located on the body mount portion in accordance with the layout of the bores on a vehicle frame member of a single model of vehicle or perhaps more than one model of vehicle. For example, a first model of vehicle may have corresponding bores (i.e., corresponding to the arm bores) a certain distance from each other while a second model of vehicle may have corresponding bores a distance from each other that is different than the first model of vehicle—the multiple layouts of the arm bores on a single accessory mount may enable one to use the same accessory mount on either vehicle. The arm bores may be located on the body mount portion in accordance with the vehicle frame member's bore layout for the upper door hinge, the lower door hinge, or both, which may be different. For example, a single accessory mount may have a layout of arm bores that correspond to the layouts on the vehicle of both the upper door hinge and the lower door hinge. The one or more arm bores may be unthreaded or threaded. Preferably, the one or more arm bores are threaded. The one or more arm bores may extend partially of fully through the body mount portion.

The arm fasteners may function to affix the body mount portion to a vehicle frame member. The arm fastener may extend through the arm bores and into bores in a vehicle frame member. The arm fasteners of the windshield frame arm and the door frame arm may be different or the same. The arm fasteners may be any suitable type of screw, nut, bolt, threaded member, nut, bolt, or a combination thereof. The arm fasteners may be stock fasteners or aftermarket. The arm fasteners may include washers.

The pivot portion may function to allow a part of the vehicle to connect to the bracket and move relative to the bracket. Preferably, the pivot portion function to allow one or more moving features to move relative to the vehicle when the bracket is connected to the vehicle. The pivot portion may be any fixture enabling rotation of one or more moving features with respect to one or more vehicle frame members. The pivot portion may include a hinge pin, a hinge sleeve, or both. The pivot portion may be located anywhere on the accessory mount, such as adjacent to the body mount portion, adjacent to the one or more hard mounting points, adjacent to the lateral support portion or incorporated in the structure of either the body mount portion, the one or more hard mounting points, the lateral support portion, or a combination thereof. Preferably, the pivot portion may be located adjacent to the body mount portion or incorporated in the structure of the lateral support portion.

The hinge pin may function to be accepted by and rotate within the hinge sleeve. The hinge sleeve may be located on either the accessory mount or the vehicle frame member. The hinge pin may be fixed within the hinge sleeve to prevent axial movement of the hinge pin or unwanted dislodgement of the hinge pin from the hinge sleeve. As such, the hinge pin may be threaded and configured to accept a fastener to thread over the hinge pin (i.e., where the hinge pin is threaded on its exterior) or thread into the hinge pin (i.e., where the hinge pin has a threaded bore extending axially a depth through the hinge pin). The hinge pin may be threaded fully along its longitudinal axis or may include a threaded portion and a non-threaded portion. The hinge pin may have a uniform or non-uniform diameter along its longitudinal axis. Where the hinge pin has a non-uniform diameter along its longitudinal axis, the hinge pin may include an unthreaded portion, which may be located adjacent the interface of the hinge pin and the lateral support portion. The unthreaded portion may have a diameter that is larger than a diameter of the threaded portion. The unthreaded portion and the threaded portion may have a diameter that is substantially equal (e.g., within 0.05 mm or less). A diameter of the unthreaded portion being larger than a diameter of the threaded portion may function to prevent lateral movement of the hinge pin within the hinge sleeve, as such, the diameter of the unthreaded portion provides for a substantially flush interface with the inner diameter of the hinge sleeve.

The hinge sleeve may function to accept and allow for free rotation of the hinge pin. The hinge sleeve may be located on either the accessory mount or the vehicle frame member. The hinge sleeve may have an inner diameter that is substantially the same as the outer diameter of at least a portion of the hinge pin. The hinge sleeve may have a through-hole, open at the distal, axial ends of the hinge sleeve, whereby the hinge sleeve accepts a hinge pin on a first distal, axial end and the hinge sleeve accepts a fastener for the hinge pin on a second distal, axial end. The hinge sleeve may have an axial length that is substantially a same length as the hinge pin. The hinge sleeve may have a length that is longer than the hinge pin.

The flange portion may be any fixture extending from an exterior of the vehicle and configured to accept a removable connection (e.g., with accessories, accessory brackets, or both). The flange portion may be flush to the vehicle or offset from the vehicle. The flange portion may be configured to form-fit a specific portion of the vehicle. For example, the flange portion may be configured to extend around the windshield frame in an aesthetically pleasing manner. The flange portion may be complementary in shape to the windshield frame. The flange portion may mirror the shape of the windshield frame. The flange portion may have a complementary shape to a specific portion of the vehicle (e.g., windshield, door, A-pillar). The flange portion may be a windshield flange, or a door flange, or both. The flange portion may include one or more hard mounting points, one or more mounting bores, or both.

The windshield flange may function to provide mounting points for accessories, accessory brackets, or both at the approximate height and location of the hinged interface of the windshield. The windshield flange may function to create a rotatable connection for the windshield and create a connection for one or more accessory brackets. The windshield flange may connect to the vehicle body at two or more locations and may connect to the windshield at one or more locations. The windshield flange may be a rotatable mount. The windshield flange may include one or more windshield frame arms, one or more lateral support portions, one or more hard mounting portions, one or more hinge pins, one or more pivot portions, one or more arm bores, one or more mounting bores, or a combination thereof. Preferably, the windshield flange connects proximate to a windshield and includes mounting bores that one or more accessory brackets may connect to. For example, the hinged interface of the windshield may be an appropriate location for a side mirror when the doors are removed.

The door flange may function to provide mounting points for accessories, accessory brackets, or both proximate to the hinged interface of the doors. For example, the door flange may provide a hinged interface at a B-pillar that a step ladder may connect to so that a user may have access to a roof of the vehicle. As another example, a location may have two door flanges and each door flange may include a hinged interface (e.g., upper and lower hinges) being disposed along the same vehicle frame member. When multiple door flanges are located proximate to one another the door flanges may accommodate accessories that are large, heavy, long, tall, wide, or combination thereof. When two or more door flanges are used in tandem, a load, stress (e.g., compression or tension), or both may be distributed between the two or more door flanges. The door flange may be separated from a body mount portion by one or more lateral support portions.

The lateral support portion may function to provide a structural connection between the body mount portion and the flange portion. The lateral support portion may support the hard mounting points. The lateral support portion may extend along a windshield. The lateral support portion may be located between a windshield frame arm and a hard mounting point. The lateral support portion may connect a windshield frame arm to a hard mounting point. Preferably, the lateral support portion supports a windshield flange that includes one or more hard mounting points and preferably a plurality of hard mounting points. The lateral support portion may be circular, square, have one or more flat walls, or a combination thereof. The lateral support portion may act as connector that both connects and support loads exerted toward one or both ends of the lateral support portion (e.g., the hard mounting point). The lateral support portion may withstand loads of about 50 kg or more, about 75 kg or more, or about 100 kg. The lateral support portion may withstand loads of about 250 kg or less or about 200 kg or less.

The hard mounting points may function to accept accessory brackets, accessories, or both. The one or more hard mounting points may be located on a flange (e.g., windshield flange or door flange). The one or more hard mounting points may be oriented on different faces of the flange. Each hard mounting portions may include one or more mounting bores or arm bores, two or more mounting bores or arm bores, three or more mounting bores or arm bores, four or more mounting bores or arm bores ten or less mounting bores or arm bores, or preferably 7 or less mounting bores or arm bores. Each of the one or more hard mounting points may include a plurality of mounting bores, a plurality of arm bores, or a combination of both. The one or more hard mounting points may be configured to accept one or more accessory brackets. The one or more hard mounting points may be configured with a low profile (i.e., enough surface area to accept a minimum number of bores necessary to safely affix the accessory brackets, accessories, or both, and enough structural volume to support the accessory brackets, accessories, or both during driving conditions). The one or more hard mounting points may be configured with a profile matching the one or more accessory brackets. The hard mounting points may be rigid. The hard mounting points may be made of metal. The hard mounting points may be complementary in shape to the vehicle, to the windshield, or about. The one or more hard mounting points may be configured with a profile matching different types of the one or more accessory brackets.

The one or more mounting bores function to receive a fastener that connects a hinge bracket to a vehicle. The one or more mounting bores may be holes extending fully or partially through the flange portion. The one or more mounting bores may be threaded, non-threaded, or both. The one or more mounting bores may be configured to accept one or more flange fasteners. The one or more mounting bores may be a plurality of mounting bores. The windshield hinge bracket, the door hinge bracket, or both may include 2 or more, 3 or more, 4 or more, 5 or more, 6 or more, or even 7 or more mounting bores. The one or more mounting bores may prevent lateral or longitudinal movement of the windshield hinge bracket, the door hinge bracket, or both relative to the vehicle. The one or more mounting bores may ensure that the windshield hinge bracket, the door hinge bracket, or both are aligned with mounting locations within the vehicle so that the windshield hinge bracket, the door hinge bracket, or both may be installed on the vehicle. The one or more mounting bores may be configured to accept one type of the one or more accessory brackets or various types of the one or more accessory brackets.

The one or more accessory brackets may function to removably connect one or more accessories to a vehicle. The one or more accessory brackets may be any fixture that is removably attached to the one or more hard mounting points and provides an interface between the one or more hard mounting points and one or more accessories. The one or more accessory brackets may be attached to the one or more mounting bores via the one or more flange fasteners. The one or more accessory brackets may retain one or more accessories on an external location of a vehicle so that the accessories are accessible when needed. The one or more accessory brackets may lock an accessory to a vehicle. The vehicle may have one or more, two or more, three or more, or even four more accessory brackets. Each hinge at each door may be connected to an accessory bracket, thus, the vehicle could have 8 total accessory brackets. Each side of the windshield may have one or even two or more accessory brackets. The accessory bracket may be configured to accept on of the one or more accessories or a variety of the one or more accessories.

The one or more accessories may include any number of aftermarket accessories for Jeep®, Wrangler®, Wrangler JK®, and Wrangler JL® brand vehicles. More specifically, the one or more accessories may include traditional light brackets, mirrors, light bars, off-road jacks, fuel cans, rotorpac type products, farm jack, roof access steps, step-up platforms, other traditional accessories, or a combination thereof.

FIG. 1 shows a vehicle 2 having one or more vehicle frame members 1a including a cowl 7, an A-pillar 60, and a door frame 9. The vehicle 2 further comprises one or more moving members 1b including a door 6 and a windshield frame 4. The windshield frame 4 is rotatably connected to the cowl 7 by one or more windshield hinges 3. The door 6 is rotatably connected to the door frame 9 by one or more door hinges 5.

Figure 2:
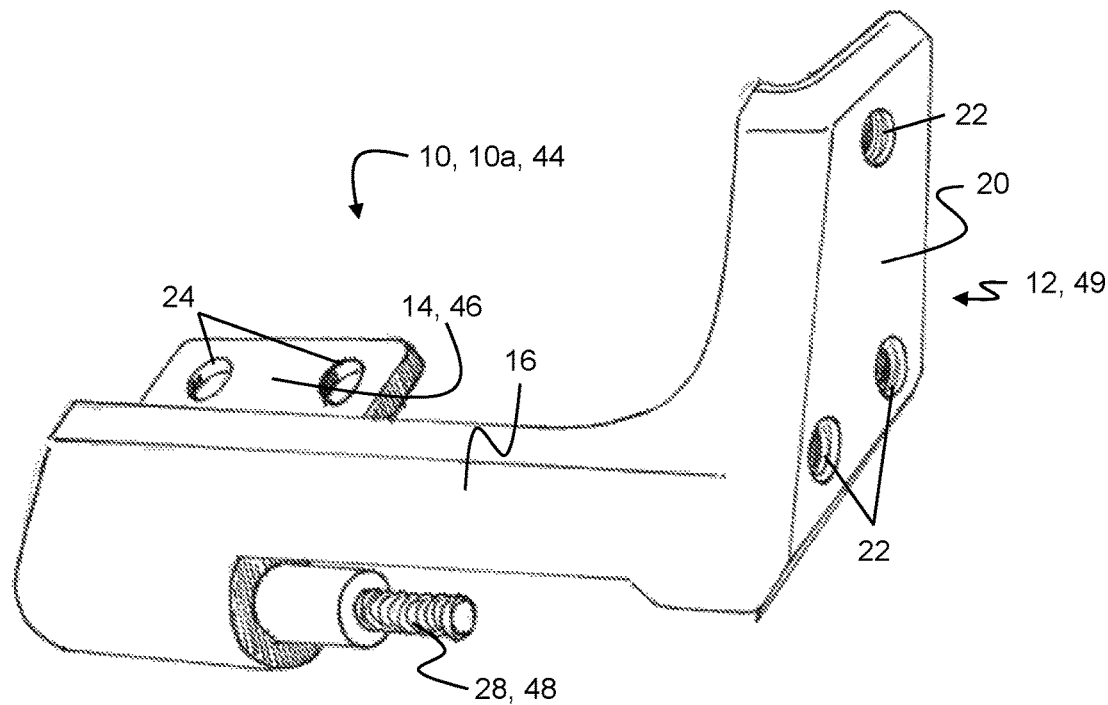
FIG. 2 is a perspective view of a windshield hinge.

FIG. 2 shows an accessory mount 44 as the windshield hinge bracket 10, more particularly the left windshield hinge bracket 10a including a body mounting portion 46, a pivot portion 48, a lateral support portion 16, a flange portion 49 (a windshield flange 12). The body mounting portion 46 is a windshield frame arm 14. The pivot portion 48 is a hinge pin 28. The windshield frame arm 14 includes one or more arm bores 24. The windshield flange 12 comprises one or more hard mounting points 20 and one or more mounting bores 22. The windshield flange 12 is supportably connected to windshield frame arm 14 by the lateral support portion 16.

Figure 3:
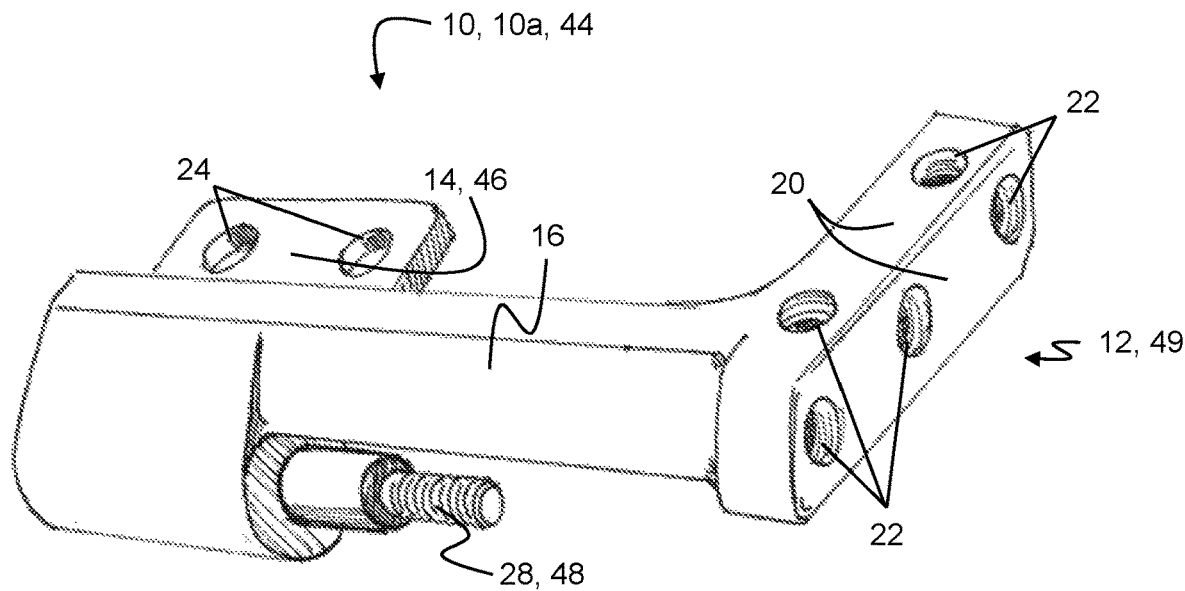
FIG. 3 is a perspective view of a windshield hinge.

FIG. 3 shows an accessory mount 44 as the windshield hinge bracket 10, more particularly the left windshield hinge bracket 10a including a body mounting portion 46, a pivot portion 48, a lateral support portion 16, and a flange portion 49 (a windshield flange 12) configured with two of the one or more hard mounting points 20. The body mounting portion 46 is a windshield frame arm 14. The pivot portion 48 is a hinge pin 28. The windshield frame arm 14 includes one or more arm bores 24. The windshield flange 12 comprises one or more hard mounting points 20 and one or more mounting bores 22. The windshield flange 12 is supportably connected to windshield frame arm 14 by the lateral support portion 16.

Figure 4:
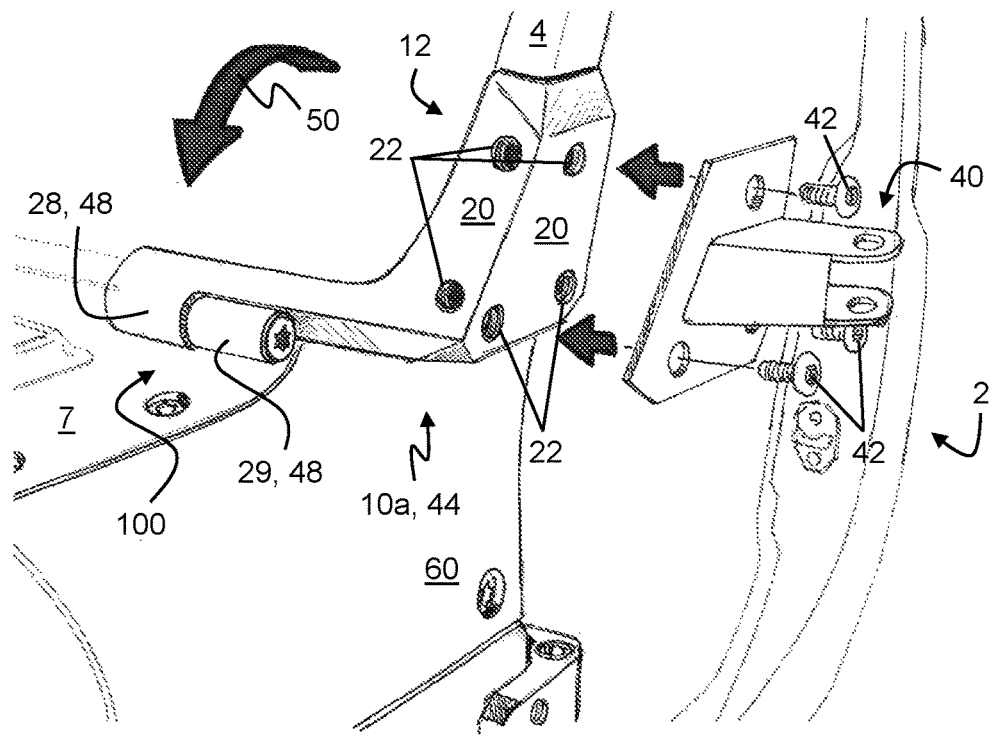
FIG. 4 illustrates a windshield hinge bracket attached to a vehicle and an exploded view of the accessory bracket and one or more flange fasteners in relation to the windshield hinge bracket.

FIG. 4 shows the accessory mount 44 as the left windshield hinge bracket 10a fitted on an A-pillar 60 of the vehicle 2. Affixed upon the cowl 7 is a pivot portion 48, which is a hinge sleeve 29. The windshield frame 4 is removably connected to the left windshield hinge bracket 10a and the pivot portion 48, which is the hinge pin 28, is rotatably connected to the hinge sleeve 29 enabling the windshield frame 4 to pivot along the path of window rotation 50. The hinge pin 28 and the hinge sleeve 29 together form the hinged interface 100. An accessory bracket 40 and one or more flange fasteners 42 are shown as aligned with the one or more mounting bores 22 for mating with the one or more hard mounting points 20. The one or more hard mounting points 20 are aligned along the A-pillar 60.

Figure 5:
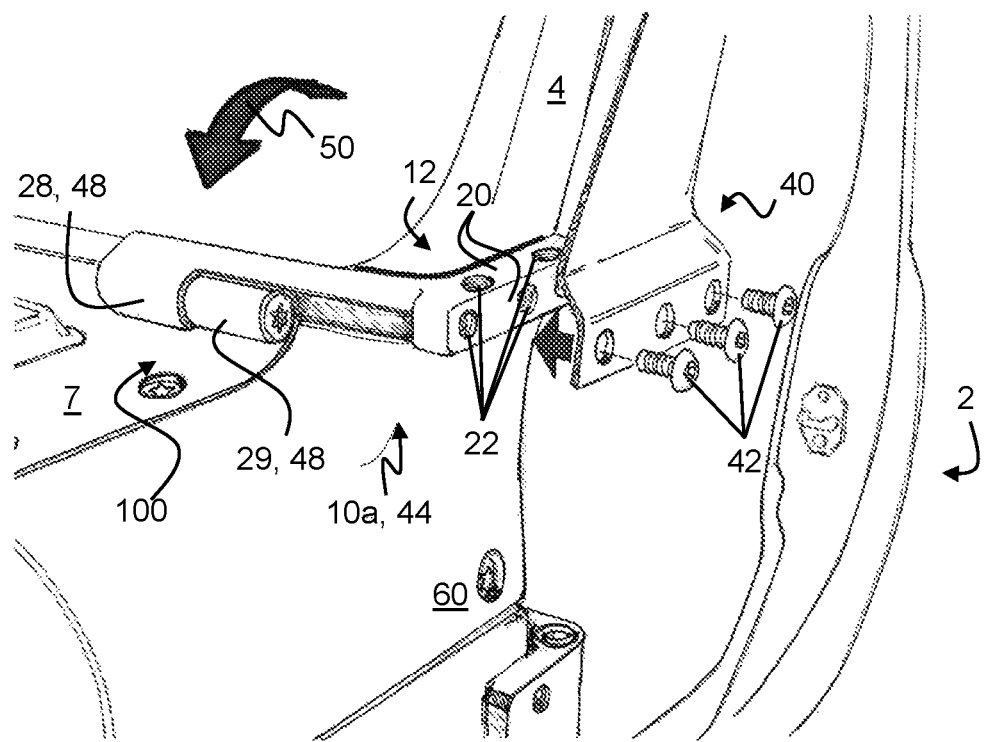
FIG. 5 illustrates a windshield hinge bracket attached to a vehicle and an exploded view of the accessory bracket and one or more flange fasteners in relation to the windshield hinge bracket.

FIG. 5 shows the accessory mount 44 as the left windshield hinge bracket 10a fitted on an A-pillar 60 of the vehicle 2 and connected to windshield flange 12 configured with a low profile and having two sets of mounting bores 22. Affixed upon the cowl 7 is a pivot portion 48, which is a hinge sleeve 29. The windshield frame 4 is removably connected to the left windshield hinge bracket 10a and the pivot portion 48, which is the hinge pin 28, is rotatably connected to the hinge sleeve 29 enabling the windshield frame 4 to pivot along the path of windshield rotation 50. The hinge pin 28 and the hinge sleeve 29 together form the hinged interface 100. An accessory bracket 40 and one or more flange fasteners 42 are shown as aligned with the one or more mounting bores 22 for mating with the one or more hard mounting points 20. The one or more hard mounting points 20 are aligned along the A-pillar 60.

Figure 6:
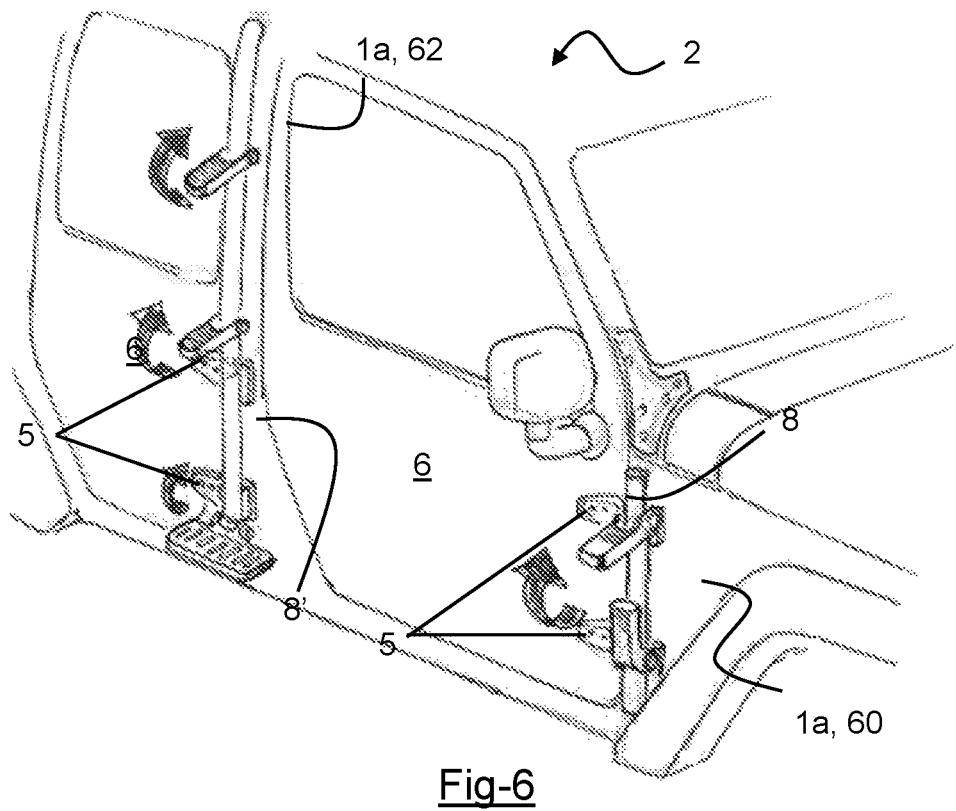
FIG. 6 is a perspective view of a side of a vehicle having one or more accessories attached.

FIG. 6 illustrates a vehicle 2 where accessories 8, 8' extends along the vehicle frame members 1a. An accessory 8 extends along the A-pillar 60 and an accessory 8' extends along the B-pillar 62. The accessories 8, 8' connect to the door hinges 5 and assist in connecting the doors 6 to the door hinges 5 near while allowing the doors 6 to be opened and closed. The accessories 8, 8' are removably attached to the door hinges 5.

Figure 7:
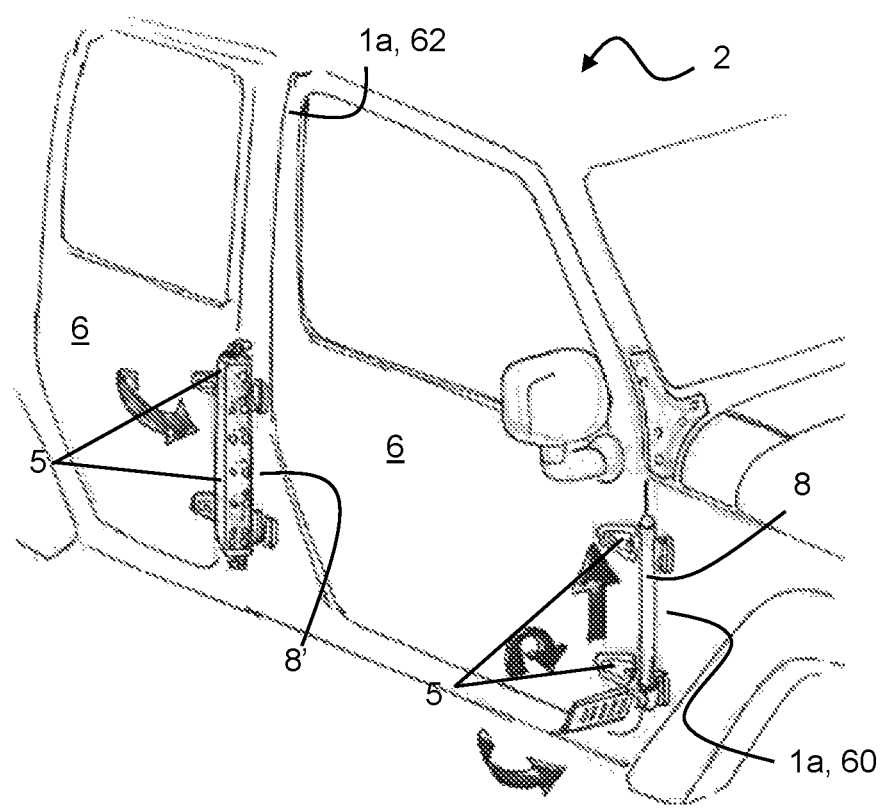
FIG. 7 is a perspective view of a side of a vehicle having one or more accessories attached.

FIG. 7 illustrates a vehicle 2 where accessories 8, 8' extend along the vehicle frame members 1a. The accessories 8, 8' being a light (located by the B-pillar 62) and a step (located by the A-pillar 60). An accessory 8 extends along the A-pillar 60, and an accessory 8' extends along the B-pillar 62. The accessories 8, 8' connect to the door hinges 5 and assist in connecting the doors 6 to the door hinges 5 while allowing the doors 6 to be opened and closed. The accessories 8, 8' are removably attached to the door hinges 5.

Figure 8:
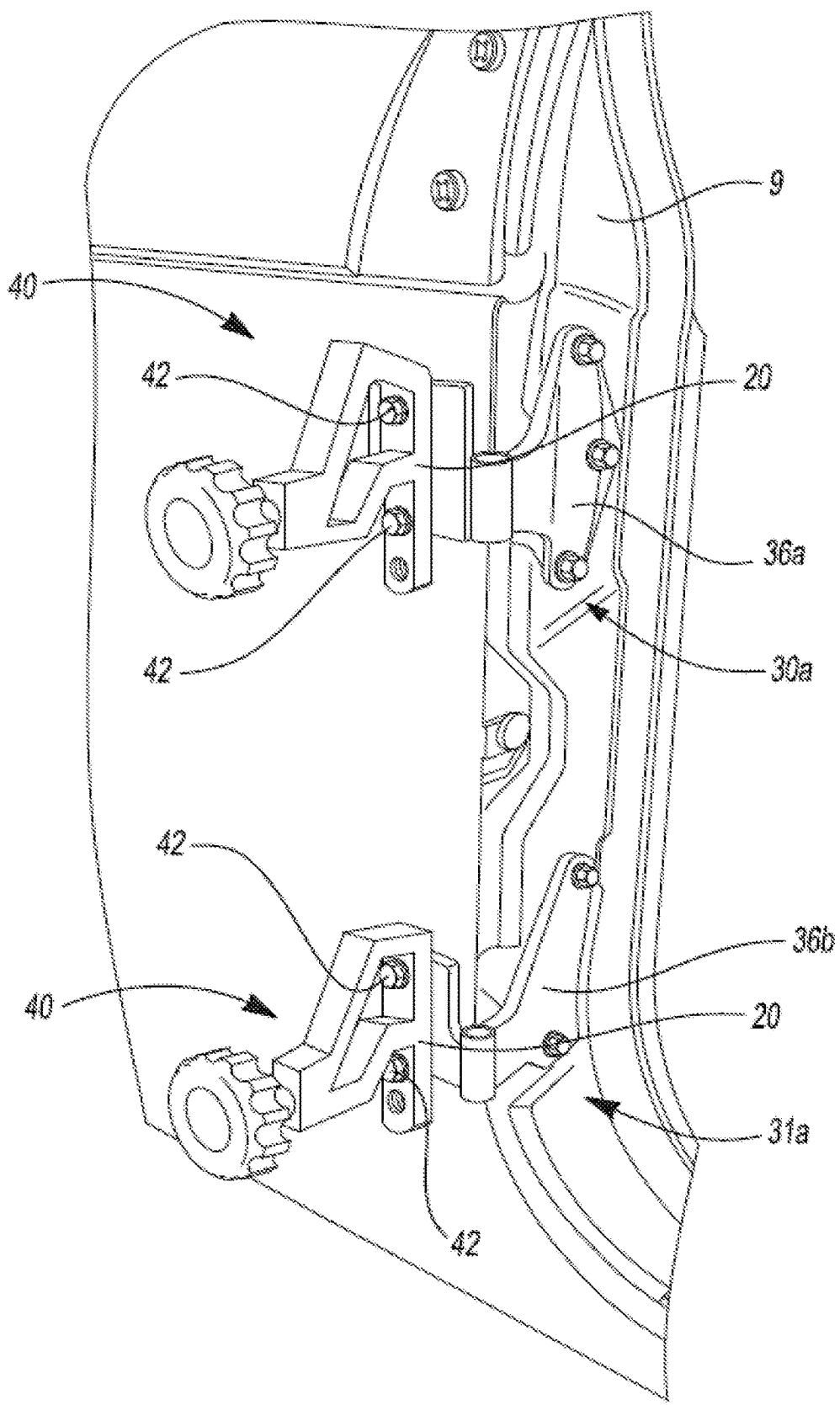
FIG. 8 illustrates a perspective view of a door frame of a vehicle and attachment of an upper left door hinge bracket and a lower left door hinge bracket.

FIG. 8 shows the door frame 9 in connection with an upper left door hinge bracket 30a and a lower left door hinge bracket 31a comprising an upper door frame arm 36a and lower door frame arm 36b, respectively. An accessory bracket 40 is affixed to the one or more hard mounting points 20 of the upper left door hinge bracket 30a and the lower left door hinge bracket 31a by one or more flange fasteners 42.

Figure 9:
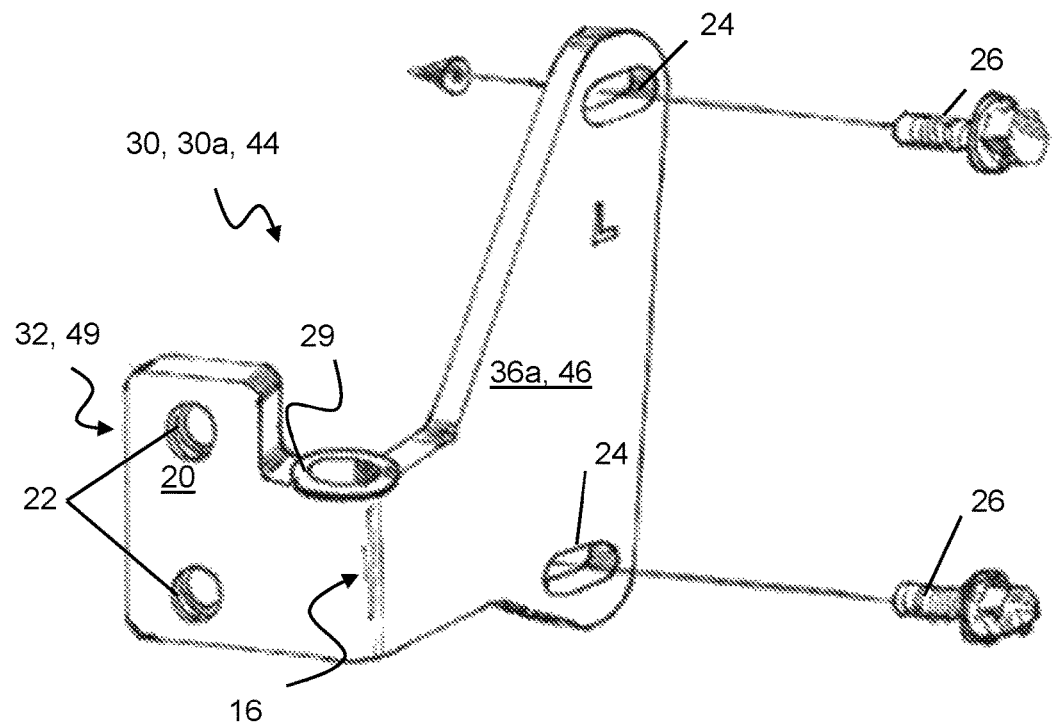
FIG. 9 is a perspective view of an upper door hinge bracket and an exploded view of the one or more arm fasteners.

FIG. 9 shows the accessory mount 44 as a door hinge bracket 30, more particularly the upper left door hinge bracket 30a having a body mount portion 46, a hinge sleeve 29, a lateral support portion 16, and a flange portion 49 (a door flange 32). The body mount portion 46 is an upper door frame arm 36a. The door flange 32 includes the one or more hard mounting points 20 and one or more mounting bores 22 that are located within the one or more hard mounting points 20. The upper door frame arm 36a includes one or more arm bores 24. One or more arm fasteners 26 align to extend through the one or more arm bores 24 to affix the upper door frame arm 36a to the vehicle (not shown). The hinge sleeve 29 is dispensed in the structure of the lateral support portion 16.

Figure 10:
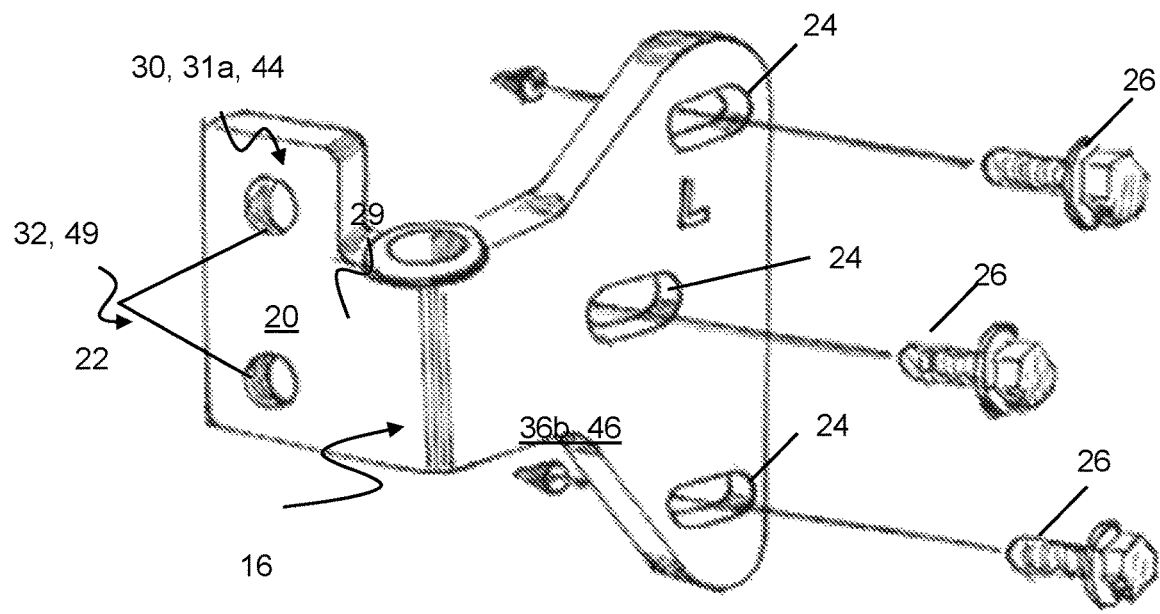
FIG. 10 is a perspective view of a lower door hinge bracket and an exploded view of the one or more arm fasteners.

FIG. 10 shows the accessory mount 44 as a door hinge bracket 30, more particularly the lower left door hinge bracket 31a having, the body mount portion 46, a hinge sleeve 29, a lateral support portion 16, and a flange portion 49 (a door flange 32). The body mount portion 46 is a lower door frame arm 36b. The door flange 32 includes the one or more hard mounting points 20 and one or more mounting bores 22 that are located within the one or more hard mounting points. The door frame arm 36b includes one or more arm bores 24. One or more arm fasteners 26 align to extend through the one or more arm bores 24 to affix the upper door frame arm 36a to the vehicle (not shown). The hinge sleeve 29 is dispensed in the structure of the lateral support portion 16.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

1a One or more vehicle frame members
1b One or more moving members
2 Vehicle
3 One or more windshield hinges
4 Windshield frame
5 One or more door hinges
6 Door
7 Cowl
8 One or more accessories
9 Door frame
10 Windshield hinge bracket
10a Left windshield hinge bracket
10b Right windshield hinge bracket
12 Windshield flange
14 Windshield frame arm
16 Lateral support portion
20 One or more hard mounting points
22 One or more mounting bores
24 One or more arm bores
26 One or more arm fasteners
28 Hinge pin
29 Hinge sleeve
30 Door hinge bracket
30a Upper left door hinge bracket
30b Upper right door hinge bracket
31a Lower left door hinge bracket
31b Lower right door hinge bracket
32 Door flange
36a Upper door frame arm 36b Lower door frame arm
40 One or more accessory brackets
42 One or more flange fasteners
44 Accessory mount
46 Body mount portion
48 Pivot portion
49 Flange portion
50 Path of windshield rotation
60 A-pillar
62 B-pillar
100 Hinged interface

I claim:

1. A windshield hinge bracket for a vehicle comprising:
   a. one or more hard mounting points,
   b. a body mount portion configured to be connected to the vehicle,
   c. a lateral support portion extending between and connecting the one or more hard mounting points and the body mount portion, the lateral support portion extends in a cross-car direction after the body mount portion is connected to the vehicle, wherein the lateral support and body mount portion are adjacent to a hood of the vehicle; and
   d. a pivot portion extending from the lateral support portion, the pivot portion extends laterally between the one or more hard mounting points and the body mount portion after the body mount portion is connected to the vehicle, the pivot portion being configured to connect to a moving member of the vehicle, the moving member of the vehicle is a windshield that is configured to pivot about the pivot portion, which is located forward of the one or more hard mounting points in vehicle position after the body mount portion is connected to the vehicle;
   wherein the one or more hard mounting points are configured to accept an accessory bracket and the accessory bracket is configured to accept one or more accessories.

2. The windshield hinge bracket according to claim 1, wherein the one or more hard mounting points are configured to align with an A-pillar, a B-pillar, or both.

3. The windshield hinge bracket according to claim 1, wherein the one or more hard mounting points are oriented in different directions.

4. The windshield hinge bracket according to claim 1, wherein the one or more hard mounting points comprise two hard mounting surfaces that are each arranged in a respective plane that are generally perpendicular to one another.

5. The windshield hinge bracket according to claim 1, wherein the body mount portion comprises one or more bores.

6. The windshield hinge bracket according to claim 1, wherein the pivot portion is a hinge pin or a hinge sleeve.

7. The windshield hinge bracket according to claim 1, wherein the pivot portion cantilevers from the lateral support portion in a direction of an outboard side of the vehicle.

8. The windshield hinge bracket according to claim 1, wherein the one or more hard mounting points is/are located outboard of the body mount portion and/or the pivot portion after the body mount portion is connected to the vehicle.

9. The windshield hinge bracket according to claim 8, wherein the pivot portion is located forward of the body mount portion in vehicle position after the body mount portion is connected to the vehicle.

10. The windshield hinge bracket according to claim 1, wherein the pivot portion is located forward of the body mount portion in vehicle position after the body mount portion is connected to the vehicle.

11. A windshield hinge bracket for a utility vehicle comprising:
    a. one or more hard mounting points,
    b. a body mount portion configured to be connected to the vehicle,
    c. a lateral support portion, wherein the lateral support and body mount portion are adjacent to a hood of the vehicle, and
    d. a pivot portion that extends laterally between the one or more hard mounting points and the body mount portion after the body mount portion is connected to the vehicle;
    wherein the one or more hard mounting points are configured to accept an accessory bracket and the accessory bracket is configured to accept one or more accessories, the one or more hard mounting points is/are located outboard of the body mount portion after the body mount portion is connected to the vehicle;
    wherein the pivot portion is configured to fixedly attach to a moving member of the vehicle, the moving member is a windshield;
    wherein the lateral support portion is configured to support the one or more hard mounting points; and
    wherein the pivot portion is configured to enable the windshield of the vehicle to move while the one or more hard mounting points is engaged with the one or more accessories.

12. The windshield hinge bracket according to claim 11, wherein the one or more hard mounting points are oriented in different directions.

13. The windshield hinge bracket according to claim 11, wherein the windshield of the vehicle is/are configured to pivot about the pivot portion, which is located forward of the one or more hard mounting points and/or the body mount portion in vehicle position after the body mount portion is connected to the vehicle.

14. The windshield hinge bracket according to claim 13, wherein the pivot portion is located forward of the body mount portion in vehicle position after the body mount portion is connected to the vehicle and/or the one or more hard mounting points is/are located outboard of the pivot portion after the body mount portion is connected to the vehicle.

15. The windshield hinge bracket according to claim 11, wherein the pivot portion is located forward of the body mount portion in vehicle position after the body mount portion is connected to the vehicle and/or the one or more hard mounting points is/are located outboard of the pivot portion after the body mount portion is connected to the vehicle.

16. A windshield hinge bracket for a utility vehicle comprising:
    a. one or more hard mounting points,
    b. a body mount portion configured to be connected to the vehicle,
    c. a lateral support portion, wherein the lateral support and body mount portion are adjacent to a hood of the vehicle, and
    d. a pivot portion;
    wherein the one or more hard mounting points are configured to accept an accessory bracket and the accessory bracket is configured to accept one or more accessories;

wherein the pivot portion is configured to fixedly attach to a moving member of the vehicle, the moving member is a windshield of the vehicle;

wherein the lateral support portion is configured to support the one or more hard mounting points; and wherein the pivot portion is configured to enable the windshield of the vehicle to move while the one or more hard mounting points is engaged with one or more accessories, the pivot portion is located forward of the one or more hard mounting points in vehicle position after the body mount portion is connected to the vehicle, the pivot portion extends laterally between the one or more hard mounting points and the body mount portion after the body mount portion is connected to the vehicle.

17. The windshield hinge bracket according to claim 16, wherein the one or more hard mounting points is/are located outboard of the body mount portion and/or the pivot portion after the body mount portion is connected to the vehicle.

18. The windshield hinge bracket according to claim 17, wherein the pivot portion is located forward of the body mount portion in vehicle position after the body mount portion is connected to the vehicle.

19. The windshield hinge bracket according to claim 16, wherein the pivot portion is located forward of the body mount portion in vehicle position after the body mount portion is connected to the vehicle.

* * * * *